United States Patent [19]

Doyle et al.

[11] Patent Number: 4,599,768
[45] Date of Patent: Jul. 15, 1986

[54] SPIN WELDED FASTENING ASSEMBLY

[75] Inventors: Beryle S. Doyle, Howell, Mich.; Brian R. Peek, Steger, Ill.

[73] Assignee: Illinois Tool Works Inc., Chicago, Ill.

[21] Appl. No.: 733,343

[22] Filed: May 13, 1985

[51] Int. Cl.$^4$ .......................... A41F 1/00; F16B 21/00
[52] U.S. Cl. ....................................... 24/590; 24/456; 24/588; 411/554
[58] Field of Search ................ 24/590, 591, 588, 589, 24/456, 297; 411/554

[56] References Cited

U.S. PATENT DOCUMENTS

| | | | |
|---|---|---|---|
| 2,693,014 | 11/1954 | Monahan | 24/590 |
| 3,179,367 | 4/1965 | Rapata | 411/554 |
| 3,860,209 | 1/1975 | Strecker | 24/590 |
| 4,400,856 | 8/1983 | Tseng | 24/590 |
| 4,477,307 | 10/1984 | Cearlock et al. | 24/456 |
| 4,527,760 | 7/1985 | Salacuse | 24/590 |

Primary Examiner—Victor N. Sakran
Attorney, Agent, or Firm—J. P. O'Brien; T. W. Buckman

[57] ABSTRACT

A spin welded fastening assembly is constructed of two interfitting components. A circular base member formed of thermoplastic material has a circular disc portion with a workpiece engaging surface for friction welding and has a circular upstanding coupler portion integrally formed on the opposite surface of the disc portion for mounting a standoff member. The standoff member has a downwardly extending circular flange portion which snaps over the upstanding circular coupler portion of the circular base member. The circular flange portion of the standoff member has a closed end in the form of a transversely extending mounting plate portion having a central mounting aperture formed therethrough. The head of a quarter turn type fastener is installed in the mounting aperture of the standoff member. The snap fitting connection between the circular flange portion of the standoff member and the upstanding circular coupler portion includes a ratchet means for permitting the standoff member to be turned in one direction only. This rotating direction is opposite to the direction which the quarter turn fastener must be turned to be is installed into the mounting aperture of the standoff member.

2 Claims, 13 Drawing Figures

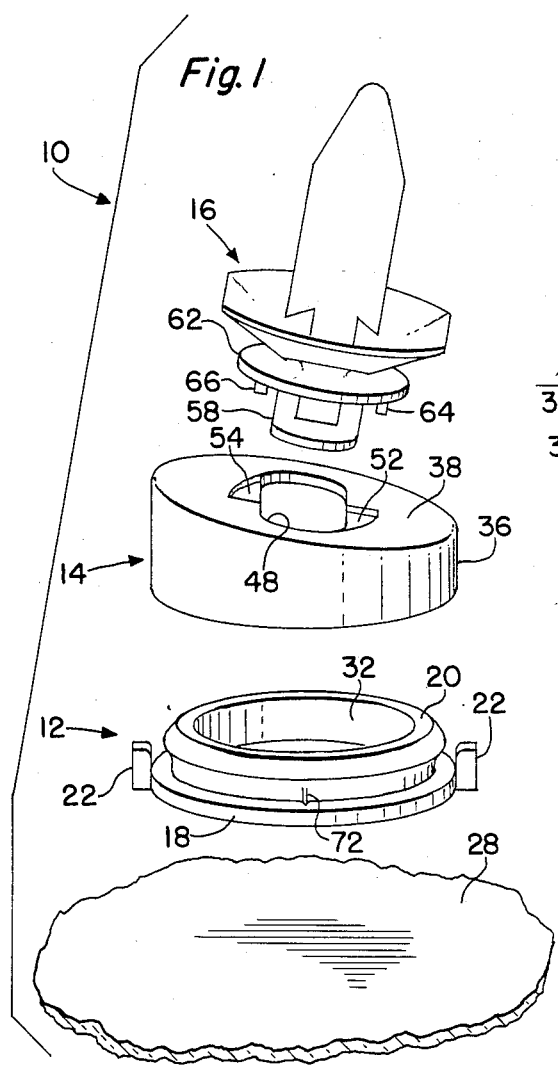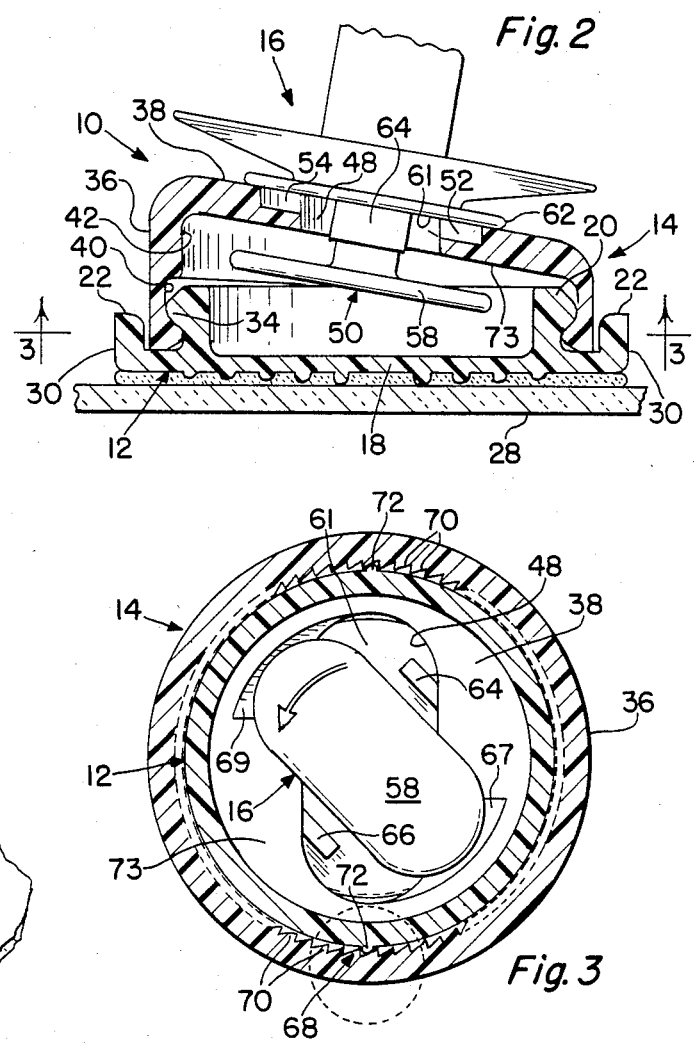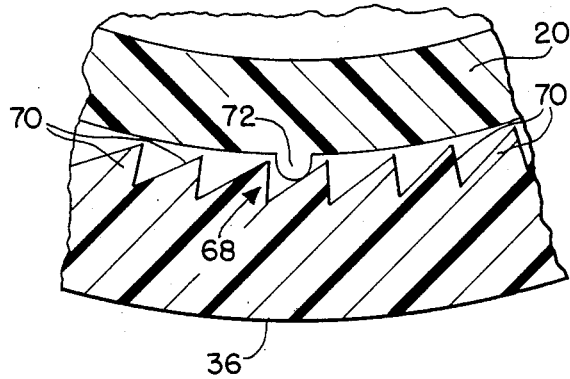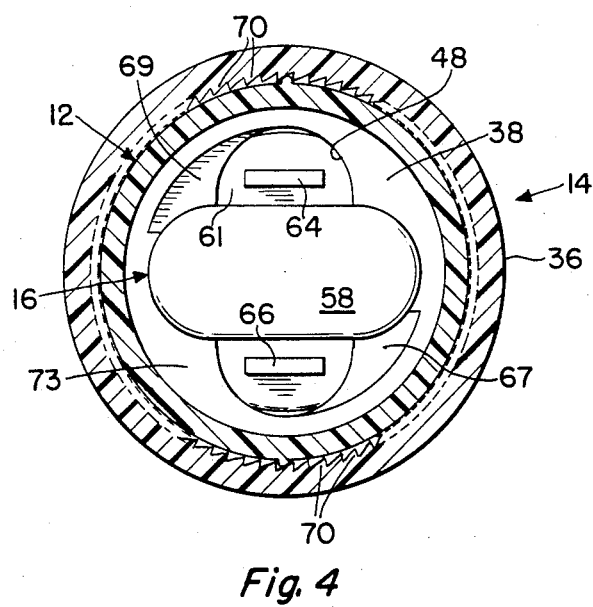
Fig. 1
Fig. 2
Fig. 3
Fig. 4
Fig. 5

4,599,768

SPIN WELDED FASTENING ASSEMBLY

BACKGROUND AND SUMMARY OF THE INVENTION

This invention relates to an assembly for attaching thermoplastic fasteners to a workpiece using a technique known as spin welding or friction welding. In particular, this invention relates to a two component fastening assembly in which one component is a base member which is spin welded to a substrate and the other component is a standoff member which is rotatably adjustable.

In a two component fastening assembly where one component is a spin welded base member and the other component is a standoff member for mounting a quarter-turn fastener, there is oftern encountered the difficulty of accommodating the need for the quarter-turn fastener to be installed into a workpiece opening at an angle relative to the spin welded base member. This invention overcomes the angular alignment problem by providing a means for angularly setting the quarter-turn fastener relative to the base member.

There is the additional problem in maintaining the angular setting of the base member during the installation of the quarter turn fastener. This invention overcomes this problem by the use of a ratchet connecting means that permits the angular setting of the base member to be made in only one rotational direction which is opposite to the rotational force exerted by the quarter turn fastener as it is installed.

These and other objects of the invention are achieved with a two component fastening assembly which combines a spin welded base member and a rotatable standoff member. The spin welding assembly of this invention utilizes a circular base member formed of thermoplastic material to provide the means for attaching by frictional spinning to a substrate. A standoff member having a circular flange portion of a diameter slightly larger than the diameter of the base member is rotationally mounted by a snap fitting connection onto the base member. The snap fitting connection includes a ratchet means for connecting the flange portion onto the base member in a manner to permit the standoff member to be rotated in one direction only. The standoff member has a mounting plate portion transversely extending to the base member with a centrally located mounting aperture of a configuration designed to receive the head of a quarter turn fastener. The head of the quarter turn fastener is installed into the mounting aperture of the standoff member with a rotative action to firmly capture the head portion. The direction of the rotative action for the quarter turn fastener is opposite to the direction of rotation permitted by the ratchet means to prevent any angular misalignment of the quarter-turn fastener relative to the base member.

DESCRIPTION OF DRAWINGS

For a better understanding of this invention, reference may be made to the accompanying drawings, in which:

FIG. 1 is an exploded view of the components that make up the preferred embodiment of this invention depicting them in order of their assembly;

FIG. 2 is a cross sectional view taken through the center line of the preferred embodiment of this invention after its base has been spin welded to a substrate and a quarter turn fastener has been installed into the mounting aperture of the standoff member;

FIG. 3 is a cross sectional view taken along the line 3—3 of FIG. 2 and looking in the direction of the arrow with the quarter turn fastener shown partially installed into the moving aperture of the standoff member;

FIG. 4 is identical to FIG. 3 with the exception that the quarter turn fastener is shown fully installed into the standoff member;

FIG. 5 is a partial enlarged view of the dotted encircled portion shown in FIG. 3 to illustrate the ratchet means for controlling the direction rotation of the standoff member relative to the base member;

DESCRIPTION OF PREFERRED EMBODIMENT

Figure 6:
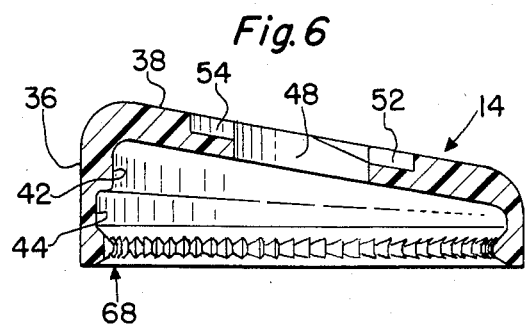
FIG. 6 is a cross sectional view taken through the center of the standoff member.
Figure 9:
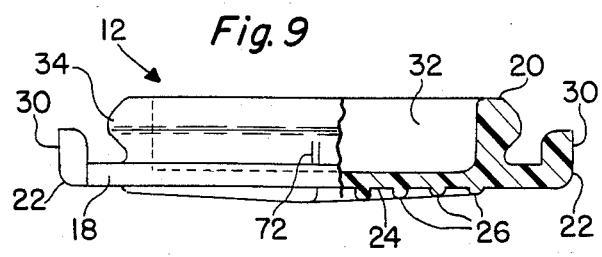
FIG. 9 is a cross sectional view taken through the center of the base member.

Referring to FIGS. 1 and 2, there is illustrated the spin welded fastening assembly embodying the principles of this invention and generally designated by the reference numeral 10.

Spin welded fastening assembly 10 is constructed of generally circular base member 212 and standoff member 14 which is adapted to mount a conventional quarter turn fastener 16.

Base member 12 is formed as an integral thermoplastic part which is made up of a disc portion 18, a coupler portion 20 and a drive means 22 for rotatably turning the base member 12 about its center axis.

Figure 11:
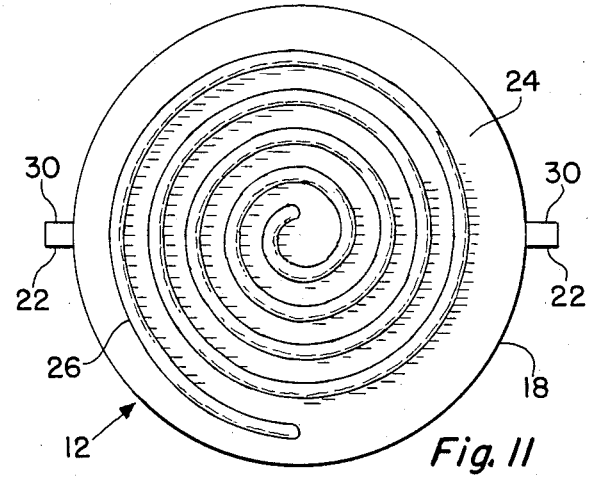
FIG. 11 is a bottom plan view of the base member illustrated in FIG. 9.
Figure 13:
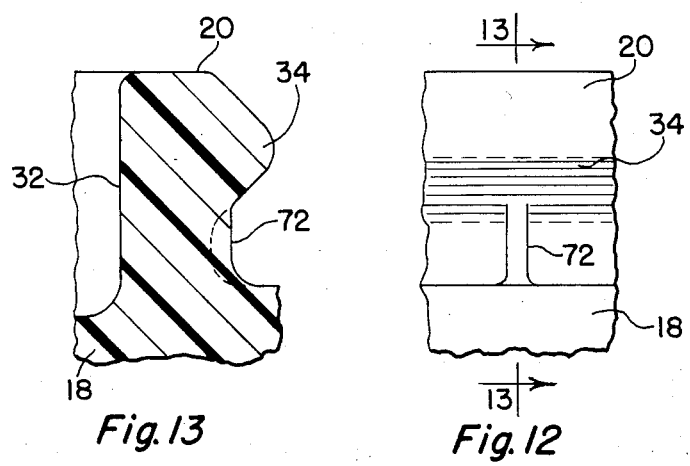
FIG. 13 is a cross sectional view taken along the lines 13—13 of FIG. 12 and looking in the direction of the arrows.
Figure 12:
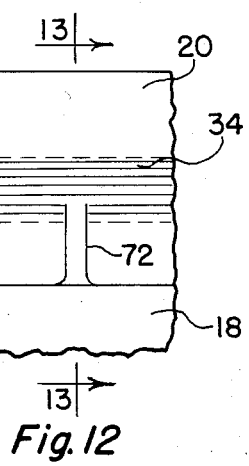
FIG. 12 is a partial cross sectional view taken along lines 12—12 of FIG. 10 and looking in the direction of the arrows.

Workpiece engaging surface 24 formed on one surface of disc portion 18 has a generally tapered surface area adapted to cause initial contact with the substrate surface at its center. An integral continuous spiral rib 26 (FIG. 11) is formed on the workpiece engaging surface 24 which extends from its center portion to the outer peripheral portion.

The workpiece engaging surface 24 is bonded to a substrate such as the metalic sheet 28 (partially illustrated in FIG. 1) by the simultaneous application of axial pressure to the base member 12 and the rotational driving of the base member. As the base 12 is rotated, Axial pressure is applied to the base member to create friction between the workpiece engaging surface 24 and substrate 28.

Drive means 22 for rotating the base member 12 is provided by a pair of peripherally extending ears 30. The ears 30 are frangibly connected to the disc portion 18 and are designed to break off to cease driving of the base member 12 upon the fusion of the workpiece engaging surface 24 to the substrate 28 by friction welding. The use of the frangible ears 22 forms no part of this invention and is fully described in U.S. Pat. No.

4,477,307, which is assigned to the same assignee as this invention.

The coupler portion 20 of base member 12 is integrally formed with the disc portion 18 in the shape of a cylindrical wall 32 which is concentric with disc portion 18. For purposes of providing a snap fitting engagement with the standoff member 14, the cylindrical wall member 32 is formed with a annular convex shaped bead 34 adjacent its outer end.

The standoff member 12 is an integrally formed molded plastic part having a circumferential flange portion 36 which is closed off at one end by a transversely extending mounting plate portion 38.

Adjacent to the outer end of circumferential flange portion 36 there is formed an annular groove 40 which is formed on its interior wall surface 42. The diameter and shape of groove 40 conforms to the outer diameter and shape of convex-shaped bead 34 to provide a snap fitting engagement therebetween when the standoff member 14 is pressed downwardly upon the coupler portion 20 to cause its resilient walls to flex outwardly temporarily.

The mounting plate portion 38 of standoff member 14 is disposed at an angle relative to disc portion 18 when the standoff member 14 is coupled to the base member 12 to provide a desired angular positioning of quarter-turn fastener 16 relative to the substrate 28. An aperture 48 is formed in the center of the mounting plate portion 38 for reveiving the head portion 50 of quarter turn fastener 16. Aperture 48 has an elliptical shape. To guide the quarter-turn fastener head portion 50 into a locking arrangement there is provided a pair of diametrically opposite arcuate ramp surfaces 52 and 54.

The head portion 50 of push-in fastener 16 has a typical configuration and forms no part of this invention. The head 50 includes outer member 58 and inner member 62. The outer member 58 has an elliptical shape slightly smaller than the shape of aperture 48 in mounting plate portion 38. The inner member 62 has a circular disc shape.

A pair of guide membes 64 and 66 is formed on the outer wall 61 of inner member 62 on diametrically opposite sides of the axis and extending towards the elliptical plate 58. The upstanding guide members 64 and 66 are disposed on opposite sides of elliptical head 60. When the elliptical head 60 is inserted through the aperture 48 the pair of guide members 64 and 66 come into contact with the pair of ramp surfaces 52 and 54 on the outer wall 63 of mounting plate 38. It is the cooperating relationship between the guide members 64 and 66 and the ramp surfaces 52 and 54 which will allow the quarter-turn fastener 16 to be rotated in only one direction as indicated in FIG. 3. This rotational motion causes the guide members 64 and 66 to ride out of the ramp surfaces 52 and 54 and trap the head outer end portion 60 inside the mounting plate portions 38 as depicted in FIG. 4. On the inner wall 65 of mounting plate portion 38, there is formed a pair of ramp surfaces 67 and 69 adjacent to the elliptical aperture 48 for guiding elliptical head 60 into an engaging relationship with the inner wall 73 of mounting plate portion 38. The installation of the quarter-turn fastener in a elliptical aperture in this manner is well known in the art and is given for illustrative purposes only.

It will be appreciated from the foregoing description that when quarter-turn fastener 16 is installed into mounting hole 48, there is a rotative force exerted against the standoff member 14. This invention provides a anti-rotative means 68 for preventing the rotation of the standoff member 14 relative to the base member 12 as the quarter-turn fastener 16 is installed.

Figure 7:
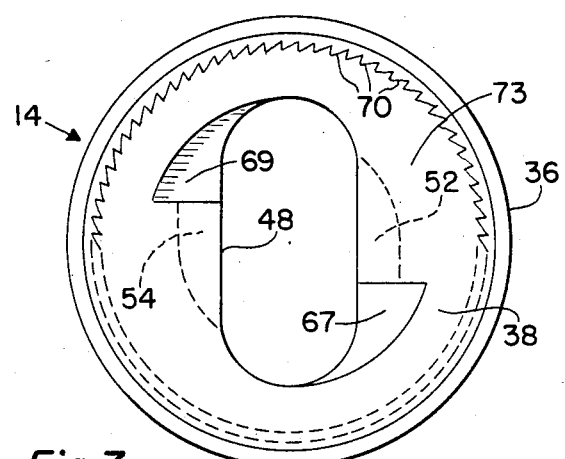
FIG. 7 is a bottom plan view of the standoff member.
Figure 10:
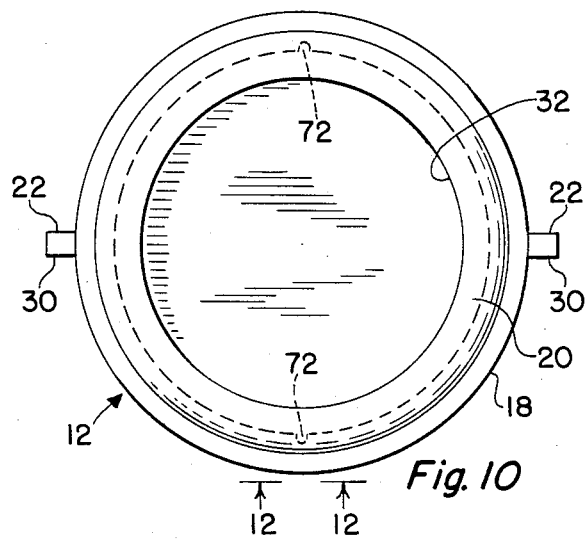
FIG. 10 is a top plan view of a base member illustrated in FIG. 9.
Figure 8:
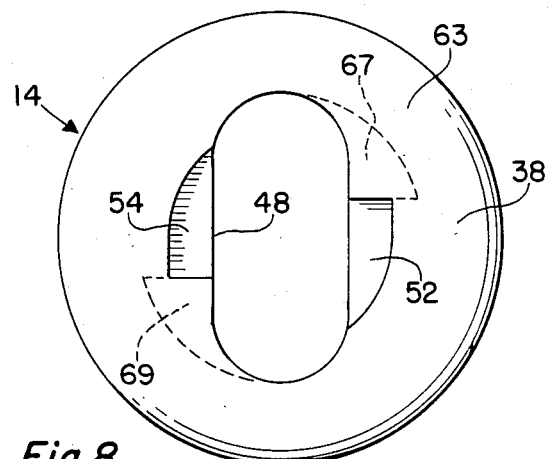
FIG. 8 is a top plan view of the standoff member illustrated in FIG. 7.

Anti-rotative means 68 is provided in the snap fitting connection between the standoff member 14 and base member 12. In particular, there is formed a plurality of ratchet teeth 70 on the outermost portion of annular bead 34. These ratchet teeth are adapted to be engaged by a pair of diametrically disposed fingers 72 formed on coupler portion 20. The fingers 72 are formed at diametrically opposite locations on the exterior of circular wall 32 between the annular bead 34 and disc portion 28 (FIGS. 7–8). As illustrated in the enlarged view of FIG. 5, each of the pair of fingers 72 ride over the ratchet teeth 70 as the standoff member 14 is rotated in a clockwise position (as viewed in FIG. 5) to pre-set the angular position of the standoff member. However, when the quarter-turn fastener 16 is installed in aperture 48 it places a counterclockwise force on the standoff member 14 which is resisted by the shape of the teeth 70 to prevent any angular movement of standoff member 14.

A description of the manner in which the spin weld fastening system 10 operates will now be described. The base member 12 is located on a substrate 28 with the workpiece engaging surface 24 resting on the substrate 28. A spin weld driving tool such as described in U.S. Pat. No. 4,477,307 is placed over the base member 12. The spin weld tool simultaneously spins the base member 12 through the driving of ears 22 and applies a downward force on the disc portion 18. When the frictional heat created by the spinning becomes efficient to provide a welded contact the ears 22 automatically break off and the base member 12 stops spinning. The tool momentarily continues to apply a downward force on the disc portion 18.

The standoff member 14 is then snap fitted over the coupler portion 20 of base member 12 and the standoff member 14 is rotated counterclockwise as viewed in FIG. 1 until the angular position of the mounting plate portion 38 is correctly set for the desired angle of orientation of quarter-turn fastener 16. The quarter-turn fastener 16 is then installed into the standoff member 14 by inserting its outer elliptical head portion 58 through the elliptical opening 48 and turning the fastener 16 clockwise as viewed in FIG. 1. Because of the resisting forces created by the interaction between the pair of teeth 72 and the ratchet teeth 70, this rotational clockwise force does not move the standoff member from its pre-set angular position.

We claim:

1. A spin welded fastening assembly comprising a circular base member formed of thermoplastic material, means for rotating said base member to cause its bottom surface to be spin welded to a substrate, a standoff member having a circumferential flange portion of a diameter slightly larger than the diameter of siad base member and having an integral mounting plate portion extending transversely relative to said flange portion, means for connecting said flange portion onto said base member in a manner to permit said standoff member to be rotated about said base member in one direction only said means for connecting said flange portion onto said base member includes a plurality teeth formed around one of said flange portion and said base member with the teeth pointing towards said one rotative direction to permit a ratcheting action, said mounting plate portion having a mounting aperture formed therethrough, a fastener member having a head portion and a shank portion, and means for mounting said head portion of said fastener member in said mounting aperture of said mounting plate portion with a rotative action to firmly capture said head portion, the direction of said rotative action being opposite to said one direction of rotation permitted by said means for connecting said flange portion onto said base member.

2. A spin welded fastening assembly comprising a circular base member formed of thermoplastic material, means for rotating said base member to cause its bottom surface to be spin welded to a substrate, a standoff member having a circumferential flange portion of a diameter slightly larger than the diameter of said base member and having a integral mounting plate portion extending transversely relative to said flange portion, said flange portion rotatively connected to said base member, ratchet means for permitting said standoff member to be rotated about said base member in one direction only said ratchet means comprising a plurality of teeth formed around one of said flange portion and said base member with the teeth pointing towards said one rotative direction, said mounting plate portion having a mounting aperture formed therethrough, a fastener member having a head portion and a shank portion, and means for mounting said head portion of said fastener member in said mounting aperture of said mounting plate portion with a rotative action to firmly capture siad head portion, the direction of said rotative action being opposite to the direction of rotation permitted by said ratchet means.

* * * * *